(12) United States Patent
Savarmand et al.

(10) Patent No.: US 9,114,421 B2
(45) Date of Patent: Aug. 25, 2015

(54) HIGH SPEED SOLVENT-BASED FLEXOGRAPHIC/ROTOGRAVURE PRINTING INKS

(75) Inventors: Saeid Savarmand, Bergenfield, NJ (US); Richard Durand, Oradell, NJ (US)

(73) Assignee: Sun Chemical Corporation, Parsippany, NJ (US)

(*) Notice: Subject to any disclaimer, the term of this patent is extended or adjusted under 35 U.S.C. 154(b) by 0 days.

(21) Appl. No.: 13/814,895

(22) PCT Filed: Aug. 18, 2010

(86) PCT No.: PCT/US2010/045875
§ 371 (c)(1),
(2), (4) Date: Feb. 7, 2013

(87) PCT Pub. No.: WO2012/023934
PCT Pub. Date: Feb. 23, 2012

(65) Prior Publication Data
US 2013/0136903 A1      May 30, 2013

(51) Int. Cl.
*B05D 5/00* (2006.01)
*C09D 11/033* (2014.01)

(52) U.S. Cl.
CPC ............... *B05D 5/00* (2013.01); *C09D 11/033* (2013.01); *Y10T 428/24802* (2015.01)

(58) Field of Classification Search
CPC ...................................................... C09D 11/00
See application file for complete search history.

(56) References Cited

U.S. PATENT DOCUMENTS 4,612,052 A * 9/1986 Schwartz ................. 524/230
2002/0016379 A1 * 2/2002 Gaeta et al. ................ 522/83

* cited by examiner

*Primary Examiner* — Veronica F Faison
(74) *Attorney, Agent, or Firm* — Charles C. Achkar; Ostrolenk Faber LLP

(57) ABSTRACT

Solvent-based flexographic or rotogravure inks are formulated to provide good pin-holing performance at high-speed printing conditions by combining the ink ingredients such the Maron-Pierce MPF (Maximum Packing Fraction) of the resulting ink is below 42 volume percent at a shear of either 10 reciprocal seconds or 2100 reciprocal seconds or both.

16 Claims, 3 Drawing Sheets

HIGH SPEED SOLVENT-BASED FLEXOGRAPHIC/ROTOGRAVURE PRINTING INKS

This application is a National Stage Application of PCT/US2010/045875, filed on Aug. 18, 2010.

FIELD OF THE INVENTION

The present invention relates to enhanced quality of printing of solvent-based flexographic and rotogravure inks at high speed.

BACKGROUND OF THE INVENTION

Flexography is one method of printing words and images onto foil, plastic film, corrugated board, paper, paperboard, cellophane, or even fabric. In fact, since the flexographic process can be used to print on such a wide variety of materials, it is often the best graphic arts reproduction process for package printing.

The anilox cylinder serves as the heart of the flexographic press. The use of an ink-metering anilox cylinder, which is engraved with a cell pattern, enables an even and fast ink transfer to the printing plate. The configuration of the cells in the anilox roller, the pressure between the rollers, and the use of a doctor blade mechanism control the amount of ink transferred to the printing plate. The shape and volume of the cells are chosen to suit the anilox surface (chrome or ceramic), the doctoring system, the press capabilities, the printing substrate, and the image type (solid or halftone). Advances in anilox technology have resulted in laser-engraved ceramic anilox rollers offering tougher and longwearing rollers with greatly improved ink release characteristics compared to conventional mechanically engraved chrome roller technology.

Flexography prints can be made with a flexible printing plate that is wrapped around a rotating cylinder. The plate is usually made of natural or synthetic rubber or a photosensitive plastic material called photopolymer. It is usually attached to the plate cylinder with double-sided sticky tape. Flexography is a relief printing process, meaning that the image area on the printing plate is raised above the non-image area.

The image area receives the ink from the anilox roller, which is transferred to the print substrate when the latter is pressed with support of the impression cylinder against the printing plate. Flexography is a direct method, that is, the printing plate transfers the ink directly to the substrate.

Due to improved registration, the most popular type of press is the CI press (central-impression) where printing units are arranged around a single central impression cylinder.

In general, the higher the speed of the press, the wider the press will be. When the press is wider and faster, the diameter of the anilox roller must be greater in order to prevent damage to the roller due to deflection and bending. A 50-inch (ca 127 cm) machine has a 6-inch (ca 15 cm) diameter anilox cylinder. The dwell time between the chamber and the ink transfer nip is shorter.

Linear speeds in excess of 1800 ft/min (ca 0.549 km/min) are considered high speed for printing flexible substrates, and presses with the capability of printing at a linear speed of 3300 ft/min (ca 1 km/min) are now appearing on the market.

The linear speed of 3300 ft/min (ca 1 km/min) is equal to a linear velocity of 35 miles per hour (ca 56.3 km/hr), and conventional plates and the double-sided sticky tape will eject from the press at this speed. In place of plates and double-sided sticky tape, direct laser engraved elastomer sleeves are used for printing at these velocities. The usual chambered doctor blade has a two-inch gap between the blades, and the dwell time for this distance at 3300 ft/min (ca 1 km/min) is less than the time of a high speed shutter on a 35 mm camera. In that interval, the air must be displaced from the cells of the anilox, ink must enter the cells, and the air must be cycled out from the chamber.

At linear speeds up to 2300 ft/min (ca 0.701 km/min), normal motors can be used; however, at linear speeds over 2300 ft/min water-cooled motors are required.

Many printers require inks and coatings to print at high speeds in order to improve the cost effectiveness of their operations. Flexographic printing linear speeds generally range up to 2000 ft/min (ca 0.609 km/min), and that speed can be expected to increase. At increasing linear speeds, for example greater than 1200 ft/min (ca 0.366 km/min), and especially 1800 ft/per minute (ca 0.549 km/min), the printability of the ink begins to deteriorate and print defects can be observed. This defect can be described as uniformly dispersed, irregularly shaped missed areas of printing. These defects are believed to result from the inability of the ink to wet out the surfaces of the printing blanket or plate or the substrate, or from the distinct mechanistic demands associated with a high speed printing press configuration as discussed in the above paragraphs.

Gravure printing is an example of intaglio printing. It uses a depressed or sunken surface for the image so that the image areas is generally honey comb shaped cells or wells that are etched or engraved into a printing cylinder. The unetched areas of the cylinder represent the non-image or unprinted areas. The cylinder rotates through an ink bath and excess ink is wiped off the cylinder by a flexible steel doctor blade. The ink remaining in the recessed cells forms the image by direct transfer to the substrate (paper or other material) as it passes between the plate cylinder and the impression cylinder.

Gravure inks are fluid inks with a very low viscosity that allows them to be drawn into the engraved cells in the cylinder then transferred onto the substrate. Flexographic and gravure inks are very similar and the basic constituents are essentially the same.

The transfer of ink to the substrate is one of the most important factors affecting the quality of the final printed product. However, due to dynamics of linear high-speed presses, conventional inks used for slower speeds will breakdown at high speeds, creating print defects. Any print defect will negatively affect productivity and the inherent printing advantages of using linear high-speed presses.

Typical flexographic/gravure printing inks contain resins, solvents, colorants, and additives. The resins include rosin esters, polyamides, polyurethanes, nitrocellulose, and others. The solvents are often based on alcohols, acetates, glycol ethers, and possibly other solvent classes.

Suspensions form the backbone of several industrial materials such as coatings, inks, paints, ceramics and cosmetics. The control and improvement of the rheology and stability of such materials in chemical engineering processes have been a significant concern of scientists and engineers for decades. The solids loading or solids content of a suspension has also a major impact on its end-use properties, such as for instance, the quality of the coating color in later printing process or the color density in printing inks. As the solids content of a suspension is a critical factor in its rheological, process and end-use properties, it is of tremendous significance to obtain the optimum properties of the suspension providing the right solids content with the desired rheological, process and end-uses properties. The fact that there could be some impact of the solids content and its maximum threshold, the so-called maximum packing fraction, on rheology, process and end-use properties was recognize but has not been investigated, K. and van de Ven, T. G. M., "Comparisons of modified effective medium theory with experimental data on shear thinning of concentrated latex dispersions," J. Rheol., 54, 1-26 (2010); Larson, R. G., The Structure and Rheology of Complex Fluids, (Oxford University Press Inc., New York, N.Y., 1999).

The traditional remedies to improve the print quality of a flexographic ink suggested lowering the viscosity of the existing low- and moderate-speed inks in order to obtain the corresponding version of the ink suitable for high-speed conditions. It was believed that reducing viscosity would lead to a better leveling and improve the pin holing. While it is true that pin holing is a result of poor leveling, reducing the ink viscosity by adding more solvent did not improve the pin holing issue.

In general, the solids content of a coating color or an ink system should provide the required end-use properties, such as the coverage and the color of the final product. To reach this requirement, coaters and printers face a dilemma: on one hand, the solids content should be beyond a minimum to provide the desired coverage and color; but on the other hand, runnability requirements limit the high end of solids content. Therefore, coaters and printers must compromise by trial and error in order to find a condition with high solids content system that has an acceptable runnability.

It has now been found that the Maximum Packing Fraction (MPF) is a parameter which allows one to optimize ink formulation. Here it is important to note that the important aspect in evaluating the runnability of a coating color or ink is not its solids content alone. Instead, the important aspect is how far the solids content is distant from the MPF. For example, two ink systems with the same solids content, e.g., 35 vol %, can have totally different runnability or end-use properties if they have different MPF's, e.g. 50 vol % and 65 vol %, respectively. The reason is that the one system with a MPF of 65 vol % will lose a significant amount of its solvent content when going from 35 vol % and getting close to a solid-like state of 65 vol %, viz. a 30 vol % difference, while the other system needs only to lose solvent in going from 30 vol % to 50 vol %, viz. 15 vol %. Thus, the second system needs to eliminate half the solvent amount that the first system must eliminate to get to the same solid-like condition. Such differences have major impacts on both runnability and the end-use properties. It has been found that the MPF can be used as a key parameter to design a formulation.

The impact of solids content on various runnability and end-use parameters are reported in the literature. Ascanio, G., Carreau, P. J., Reglat, O. and Tanguy, P. A., "Extensional properties of coating colors at high strain rates," TAPPI Adv. Coat. Fundam. Symp. 8th, Chicago, Ill., 172-182 (May 8-10, 2003); Backfolk, K., Grankvist, T. and Triantafillopoulos, N., "Slip rheology of coating colors containing calcium carbonate pigments with narrow particle size distributions," TAPPI Adv. Coat. Fundam. Symp., 8th, Chicago, Ill., 148-165 (May 8-10, 2003). However, the application of the MPF as a formulating tool to design a formulation leading to a superior runnability has not been recognized.

SUMMARY OF THE INVENTION

The present invention relates to the use of the maximum packing fraction (MPF) as a guiding formulation parameter for flexographic and/or rotogravure inks, especially those used under high speed printing conditions. Although the significance of solids loading is well known in industries dealing with pigments, the usage of the maximum packing fraction as a formulating parameter in the ink and coating industry, and particularly flexographic printing, has not been addressed.

This invention thus relates to the high-speed printing of the solvent-based flexographic/gravure inks. Pin holing is a common runnability problem for the high-speed printing of the flexographic inks. Since the pin holing relates to how the ink levels or settles on the substrate at the high speed of the print, the mechanism through which the transition from liquid-like to solid-like behaviors of the ink occurs becomes important. It has been found that the solids content of the suspension alone is insufficient to evaluate how distant the suspension is from a solid-like behavior. Rather, it is the distance from the maximum packing fraction (MPF) of the suspension that determines the extent of solid-like or liquid-like behavior of a suspension. Therefore, the first step is to determine the MPF of the inks. It is shown in this invention that inks with a MPF below a certain limit lead to improved pin holing performance at high speed printing comparing to the inks with the MPF above the given threshold.

DETAILED DESCRIPTION OF THE INVENTION

Figure 1:
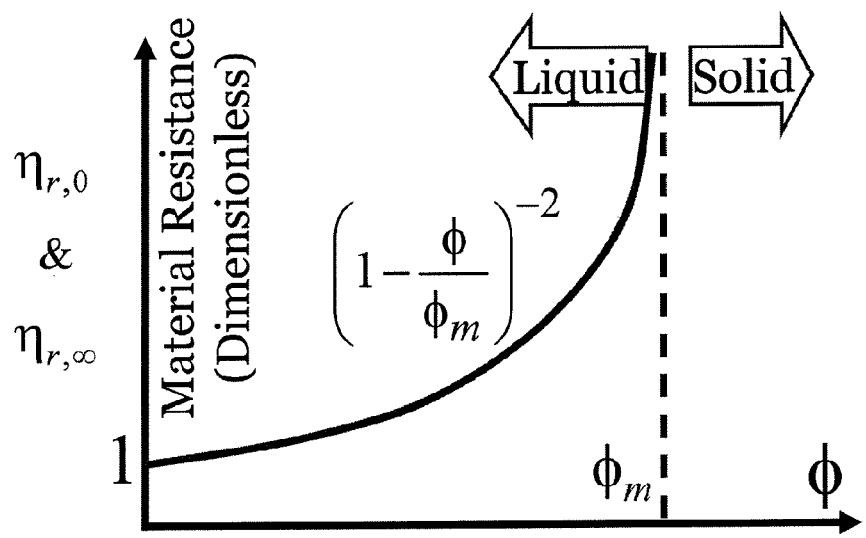
FIG. 1 is a schematic of the variations of steady shear viscosity at two shearing conditions (low shear range denoted by the subscript "0" and high shear range denoted by "∞"). Viscosities are shown in terms of relative viscosity, viz. viscosity of the suspension divided by the viscosity of the medium at the same shearing condition. As can be seen, the relative viscosity increases drastically as the solids content of the suspensions approaches the MPF (maximum packing fraction).

The present invention relates to solvent-based flexographic or rotogravure ink or coating formulations comprising printing ink resins or binders, dispersed colorants (optional), solvents, and various additives. The ink resins may include polyamides, polyurethanes, rosin esters, metallized rosin esters, nitrocellulose, or other printing ink resins. The dispersed colorants are comprised of any of a number of various pigments, pigment dispersions, or other colorants. The solvents include any of a number of organic solvents such as those selected from various alcohols, acetates, and glycol ether solvents. Typical examples include ethanol, normal propyl alcohol, normal propylacetate, isopropylacetate, ethylacetate, diacetone alcohol, propylene glycol monopropyl ether, and propylene glycol monopropyl ether acetate. The solvent component may also include water in an amount of up to about 5 wt %, and preferably about 0.5 to 2% when present.

An extensive listing of commercially available resins, solvents, and colorants, as well as other conventional components, can be found in The Printer's Manual, which is hereby incorporated herein by reference. Drying of the composition can be by application of heat or actinic radiation, and in the latter instance photoinitiators may be present.

In general, the binder resin component is about 5 to 30 wt % of the composition, preferably about 10 to 15 wt %, the solvent is about 40 to 70 wt % of the composition, preferably about 60 to 70 wt %, the colorant when present is about 4 to 25 wt % of the composition, preferably about 15 to 18 wt %, and the other components make up the balance. Water, when present, is up to about 5 wt %, preferably about 0.5 to 2%

The binder system of the ink formulations is selected in order to provide the range of printing properties which are required for flexographic or rotogravure printing, in terms of the final properties of the printed films with respect to print quality and aesthetics, color, opacity, ink adhesion and lamination properties, barrier properties, pigment dispersion, special effects, blocking requirements, sealing properties, surface resistance, drying, and myriad others. The colorant is selected to provide a typical full gamut of hues typical of flexographic and rotogravure printing, and to be consistent with the required properties and print quality as noted above. The inks of the present invention will contain various additives such as slip agents, waxes, and others typically used in flexographic and rotogravure inks to achieve required properties as described above.

Einstein (Einstein, A., "Eine neue Bestimmung der Molekuldimension," Ann. Physik, 19, 289-306 (1906). Einstein, A., "Berichtigung zu meiner Arbeit: Eine neue Bestimmung der Molekuldimension," Ann. Physik, 34, 591-592 (1911).) developed a theory showing how monodisperse spherical particles increased the viscosity of a liquid according to the equation $$\frac{\eta}{\eta_s} = \eta_r = 1 + 2.5\phi = 1 + [\eta]\phi \text{ as } \phi \to 0 \qquad (1)$$

where $\eta$, $\eta_s$, $\eta_r$ and $\phi$ denote the viscosity of the suspensions, the viscosity of the medium, the relative viscosity and the volume fraction of the solids, respectively. $[\eta]$ is the intrinsic viscosity of the suspension defined as $$[\eta] = \lim_{\phi \to 0} \frac{\eta - \eta_s}{\phi \eta_s} = \lim_{\phi \to 0} \frac{\eta_r - 1}{\phi} \qquad (2)$$

As the solids content of the suspension increases, the linear Eq. (1) does not hold anymore. At a given shear rate $\dot{\gamma}$, it can be shown that many of the empirical generalization of Eq. (1) have a similar base originating from the following model (Ball, R. and Richmond, P., "Dynamics of Colloidal Dispersions Review Article," Phys. Chem. Liq., 9, 999-116 (1980)), (Sudduth, R. D., "A generalized model to predict the viscosity of solutions with suspended particles. I," J. Appl. Polym. Sci., 48, 25-36 (1993))

$$\left.\frac{d\eta}{\eta_r}\right|_{\dot{\gamma}} = [\eta](1 - k\Phi)^{-\alpha} d\Phi \qquad (3)$$

where k and $\alpha$ are the crowding factor and a constant at the shear rate $\dot{\gamma}$, respectively. Solving this differential equation needs a boundary condition defining the so-called maximum packing fraction (MPF) $\phi_m(\dot{\gamma})$ as following $$\eta_r \to \infty \text{ as } \phi \to \phi^m \qquad (4)$$

Eq. (4) indicates that as the solids content of a suspension increases beyond a critical threshold called the MPF, the material's mechanical response changes from a liquid-like to a solid-like behavior as its viscosity moves toward the infinity characteristic of solid materials (FIG. 1). Various empirical equations have been generated from Eqs. (3) and (4), however, two of them have attracted more attentions due to their practical uses, viz. the Maron-Pierce (Maron, S. H. and Pierce, P. E., "Application of Ree-Eyring generalized flow theory to suspensions of spherical particles," J. Colloid Sci., 11, 80-95 (1956)) and Krieger-Dougherty (Krieger, I. M. and Dougherty, T. J., "A mechanism for non-Newtonian flow in suspensions of rigid spheres," Trans. Soc. Rheol., 3, 137-152 (1959)) equations given as $$\eta_r(\dot{\gamma}) = \left(1 - \frac{\Phi}{\Phi_m(\dot{\gamma})}\right)^{-2} \quad (M\text{-}P \text{ equation}) \qquad (5)$$

$$\eta_r(\dot{\gamma}) = \left(1 - \frac{\Phi}{\Phi_m(\dot{\gamma})}\right)^{-[\eta]*\Phi_m(\dot{\gamma})} \quad (K\text{-}D \text{ equation}) \qquad (6)$$

The difference between M-P and K-D equation is in the value of the exponent. The fact that the product $([\eta]\phi_m)* \dot{\eta}$ is close to 2 for many systems of isometric particles as well as fewer adjustable model parameters make the M-P simpler to apply. In any case, the fitting capability will show if the flexibility of a model is enough for the application purposes.

The value of the MPF depends on the arrangement of particles. For monodisperse spherical particles, the MPF ranges from 0.52 for cubic arrangement to 0.74 for a hexagonal close packed one. As the arrangement of particles is affected by the shearing conditions imposed on the system, the value of MPF is a function of shear rate as well. As the shear rate (or stress) increases, the particles have a better chance to find spaces among each other and the free space is increased, which ultimately raises the potential of more packing and increasing the MPF. The low-shear and high-shear values of the MPF and intrinsic viscosity were reported by de Kruif et al. (de Kruif, C. G., van Iersel, E. M. F., Vrij, A. and Russel, W. B., "Hard sphere colloidal dispersions: Viscosity as a function of shear rate and volume fraction," Am. Inst. Phys., 83, 4717-4725 (1985)) and Krieger (Krieger, I. M., "Rheology of monodisperse latices," Adv. Colloid Interface Sci., 3, 111-136 (1972)) as $$[\eta]_0=3.13 \ \& \ \phi_{m,0}=0.63; \ [\eta]^*\phi_m=1.92; \ 2 \text{ as } \dot{\gamma} \to 0$$

$$[\eta]_\infty=2.71 \ \& \ \phi_{m,\infty}=0.71; \ [\eta]^*\phi_m=1.97; \ 2 \text{ as } \dot{\gamma} \to \infty \qquad (7)$$

Although both intrinsic viscosity and the MPF are functions of shearing condition, for spherical non-interacting systems, a good estimate for the product $[\eta] \cdot \phi_m$ is the value 2. We also found that the value 2 is adequately capable of fitting the experimental data for solvent-based flexographic inks.

The MPF is also a function of particle size and shape and their distributions. Increasing the polydispersity of the solids can drastically decrease the level of viscosity while maintaining the total solid content of the suspension. (Brunelle, P., "Polydisperse composite emulsions," WO Patent 2008074138 A1, (Jun. 26, 2008).) (Greenwood, R., Luckham, P. F. and Gregory, T., "The effect of diameter ratio and volume ratio on the viscosity of bimodal suspensions of polymer latices," J. Colloid Interface Sci., 191, 11-21 (1997).) Increasing polydispersity is one of the techniques of loading more solids in a suspension for particular end-use properties, such as coverage in coating colors or color density in printing.

The MPF is further affected by the chemistry of the solids and the medium. The MPF is also affected by the existence of a layer on the core particle occurring in steric stabilized and electrostatically stabilized systems. In the steric stabilization, a layer of thickness $\Delta$ is grafted into the core particle of radius a. The "effective" MPF is then defined as $$\phi_{m,\mathit{eff}} = \phi_m\left(1 + \frac{\Delta}{a}\right)^3 \text{ (Sterically-stabilized systems)} \quad (8)$$

where $\phi_m$ is the volume fraction of the "bare" uncoated particles. Similarly the MPF of the electrostatically-stabilized system can be obtained as $$\phi_{m,\mathit{eff}} = \phi_m\left(\frac{d_{\mathit{eff}}}{2a}\right)^3 \text{ (Electrostatically-stabilized systems)} \quad (9)$$

Where $d_{\mathit{eff}}$ is the effective particle diameter including the electric double layer thickness, details of which can be found elsewhere. (Russel, W. B., Saville, D. A. and Schowalter, W. R., Colloidal Dispersions, (Cambridge University Press, Cambridge, 1989).)

Determination of MPF

The models in Eqs. (5) and (6) have been used in many industries due to their practical and efficient features. The main difference between the Maron-Pierce, and Krieger-Dougherty equations is the exponent, which in the case of Maron-Pierce equation the exponent is a constant value. As long as the fitting capability (i.e., a correlation coefficient equal to or greater than 85%) of the Maron-Pierce equation is satisfactory, there is no need to use the Krieger-Dougherty equation which has more that one more parameter to adjust. The Maron-Pierce has showed to be satisfactory and is used below.

To obtain the parameters of Maron-Pierce equation, Eq. (5) at a given shear rate, the equation can be transformed to the following, which is a linear relationship between the inverse square root of relative viscosity and the solids content.

$$\eta^{-1/2} = \eta_s^{-1/2}(1-\phi/\phi_m) \quad (10)$$

Figure 2:
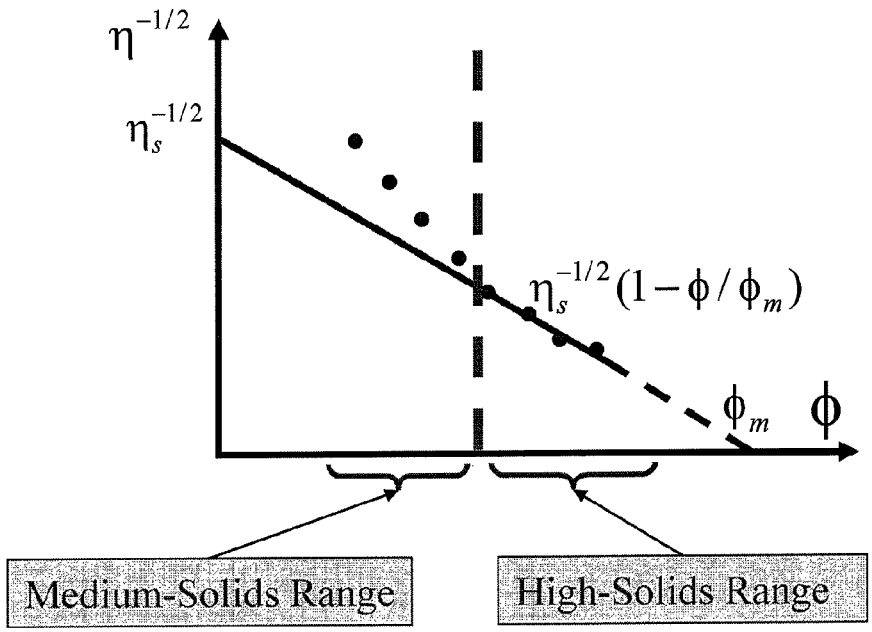
FIG. 2 is a representative fitting of the experimental data with the Maron-Pierce (M-P) model, Eq. (10), in a linear form in terms of the inverse of square root of relative viscosity vs. solids content. The y-intercept of the line determines the inverse square root of the viscosity of the medium and the x-intercept represents the ratio of the inverse square root of the viscosity of the medium divided by the maximum packing fraction. By knowing the values of the two intercepts, the maximum packing fraction and the viscosity of the medium can be determined. This Figure also shows the validity range of the model. Since the M-P (or K-D) model is being used to determine the maximum packing fraction, they should be applied to high solids (at least 15 vol. % and more preferably at least 20 vol. %) content systems. The model does not provide a suitable fit for medium and low solids content systems.

This equation best fits in the high solids range. At intermediate solids content, the nonlinearity can be seen in the graph of the data. $\phi_m$ and $\eta_s^{-1/2}/\phi_m$ can be obtained from the x- and y-intercepts of Eq. (10), respectively. The correlation factor shows how well the model fits the data. A representation is shown in FIG. 2.

In accordance with the present invention, standard and conventional ink ingredients are used to formulate the ink for high speed printing but are selected such that the MPF is below about 42 vol % when measured at a shear rate of 10 reciprocal seconds or 2100 reciprocal seconds, or both, and preferably below about 39 vol %, and most preferably below about 36 vol %. As noted above, the determination of the MPF value is known in the art.

EXAMPLE

Four flexographic inks with different pin-holing performances were investigated. They are identified below as Inks 1, 2, 3, and 4, and have a performance ranking of 1, 2, 3 and 5, respectively, where 5 is the best and 1 is the poorest print (pin holing) quality at high speed, i.e., at least 1800 ft/min (ca 9 m/s). Full rheological profiles for these inks were obtained at various levels of solvents. The solvents were extracted using a rotovap to increase the solids content and simulate the drying process after the transfer of the ink. As the MPF is a function of shearing condition, two commonly used shear rates, 10 and 2100 reciprocal seconds, were considered as representative of low and high shear. Eq. (10) and FIG. 2 were used to obtain the MPF at the two shearing conditions and the results are given in Table 1.

TABLE 1

Results of MPF, $\phi_m$, of four flexographic inks

| | | Shearing Condition | | | | | |
|---|---|---|---|---|---|---|---|
| | | 10/s | | | 2100/s | | |
| Parameter | Performance Pin holing | Correlation coefficient | $\phi_m$ | $\eta_s$ | Correlation coefficient | $\phi_m$ Vol | $\eta_s$ |
| Units | 1 to 5 | % | vol % wt % | (cP) | % | % wt % | (cP) |
| Ink 1 | 2 | 99.8 | 44.5 56.6 | 119 | 99.5 | 44.9 57.0 | 17.4 |
| Ink 2 | 1 | 96.1 | 43.5 57.1 | 157 | 92.8 | 42.8 56.4 | 22.1 |
| Ink 3 | 3 | 98.2 | 39.2 49.9 | 203 | 95.8 | 39.6 50.3 | 23.2 |
| Ink 4 | 5 | 97.6 | 33.4 44.7 | 215 | 97.1 | 30.5 41.5 | 11.2 |

1 cP (1 centi Poise) = 1 mPa · s (1 milliPascal second)

Figure 3:
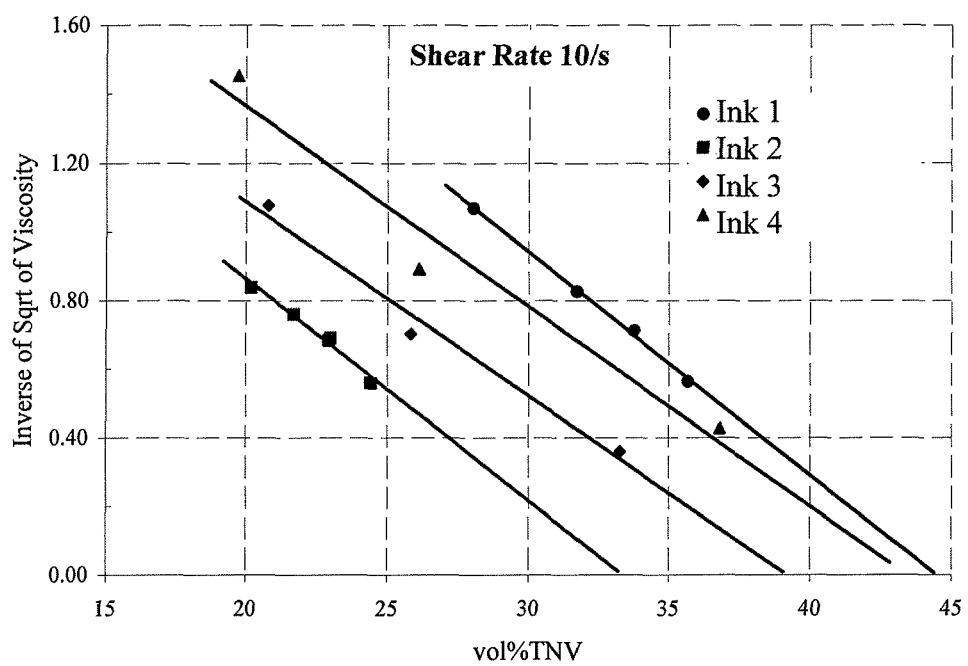
FIG. 3 shows the plot of the inverse square root of shear viscosity at 10 s$^{-1}$ vs. vol % TNV where vol % TNV denotes the volume percentage of total non-volatiles, a parameter commonly used in ink industry rather than solids fraction.
Figure 4:
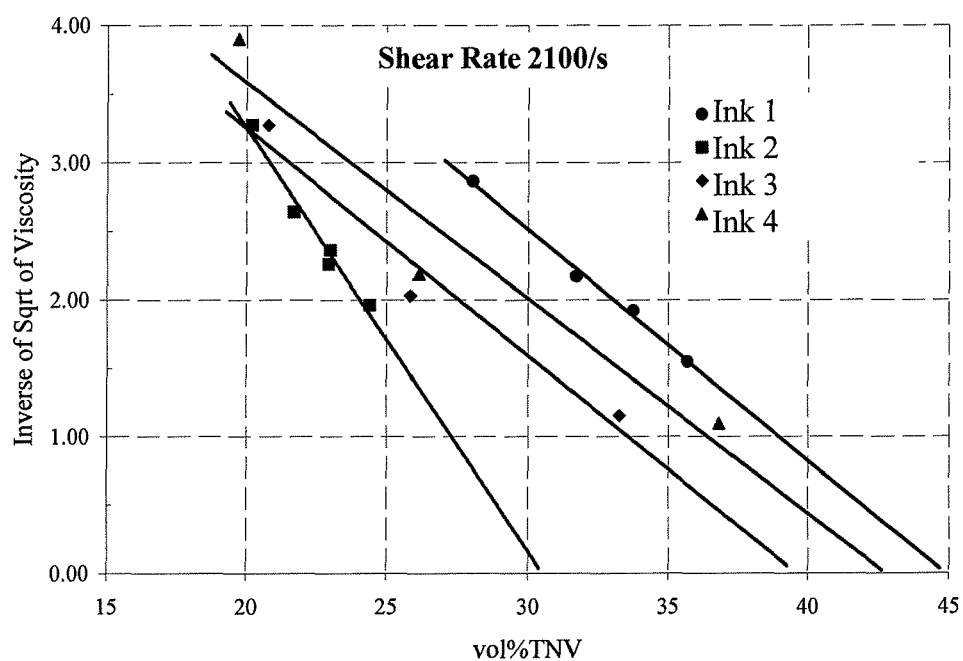
FIG. 4 shows the plot of the inverse square root of shear viscosity at 2100 s$^{-1}$ vs. vol % TNV.

FIGS. 3 and 4 plot $\eta^{-1/2}$ vs. vol % TNV where vol % TNV denotes the volume percentage of total non-volatiles. The numerical results for the MPF of the inks together with their corresponding performance attributes are presented in Table 1 above. It can be seen that the smallest MPF (33.4 vol %) corresponds to the best pin-holing performance. As the MPF increases, the pin-holing performance deteriorates.

The high values of correlation coefficient shows how satisfactorily the Maron-Pierce equation, Eq. (10), correlates the experimental data.

Various changes can be made without departing from the spirit and scope to the present invention. The various embodiments referred to herein were for the purpose of illustration only and are not intended to limit the invention.

What is claimed is:

1. A method of formulating a solvent-based flexographic or rotogravure ink to provide good pin-holing performance at high-speed printing conditions comprising combining the ink ingredients such that the Maron-Pierce MPF (Maximum Packing Fraction) of the resulting ink is below 42 volume percent at a shear of either 10 reciprocal seconds or 2100 reciprocal seconds;

wherein the MPF is determined by testing the ink at a series of stages of drying as the solids content is increasing, and the MPF is a linear relationship between the inverse square root of viscosity and the solids content; and wherein the MPF is calculated using Equation (10):

$$\eta^{-1/2} = \eta_s^{-1/2}(1-(\phi/\phi_m))$$

wherein:

$\eta$ is the intrinsic viscosity of the suspension;
$\eta_s$ is the viscosity of the medium;
$\phi$ is the volume fraction of the solids; and
$\phi_m$ is the maximum packing fraction (MPF).

2. The method of claim 1 in which the MPF is less than 42 volume percent at both of said shear values.

3. The method of claim 1 in which the MPF is less than 40 volume percent at one of said shear values.

4. The method of claim 1 in which the MPF is less than 39 volume percent at one of said shear values.

5. The method of claim 1 in which the MPF is less than 35 volume percent at one of said shear values.

6. A method of formulating a solvent-based flexographic ink to provide good pin-holing performance at high-speed printing conditions comprising selecting the ink ingredients such that the MPF (Maximum Packing Fraction) of the resulting ink is below 42 volume percent at a shear of 10 reciprocal seconds or 2100 reciprocal seconds;

wherein the MPF is determined by testing the ink at a series of stages of drying as the solids content is increasing, and the MPF is a linear relationship between the inverse square root of viscosity and the solids content; and wherein the MPF is calculated using Equation (10):

$$\eta^{-1/2} = \eta_s^{-1/2}(1-(\phi/\phi_m))$$

wherein:

$\eta$ is the intrinsic viscosity of the suspension;
$\eta_s$ is the viscosity of the medium;
$\phi$ is the volume fraction of the solids; and
$\phi_m$ is the maximum packing fraction (MPF).

7. The method of claim 6 in which the ink ingredients are selected such that the MPF is less than 42 volume percent at both of said shear values.

8. The method of claim 6 in which the ink ingredients are selected such that the MPF is less than 40 volume percent at one of said shear values.

9. The method of claim 6 in which the ink ingredients are selected such that the MPF is less than 39 volume percent at one of said shear values.

10. The method of claim 6 in which the ink ingredients are selected such that the MPF is less than 35 volume percent at one of said shear values.

11. A method which comprises formulating a solvent-based flexographic ink by the method of claim 6, and applying the resulting ink to a substrate under high-speed printing conditions.

12. The method of claim 11 in which the ink ingredients are selected such that the MPF is less than 40 volume percent at one of said shear values.

13. The method of claim 11 in which the ink ingredients are selected such that the MPF is less than 39 volume percent at one of said shear values.

14. The method of claim 11 in which the ink ingredients are selected such that the MPF is less than 35 volume percent at one of said shear values.

15. An ink produced by the method of claim 11.

16. An article produced by applying an ink of claim 15 to a substrate.

* * * * *